United States Patent [19]

Rosen

[11] 4,452,940

[45] Jun. 5, 1984

[54] POLYMER WATER-IN-OIL EMULSIONS

[75] Inventor: Meyer R. Rosen, Spring Valley, N.Y.

[73] Assignee: Union Carbide Corporation, Danbury, Conn.

[21] Appl. No.: 547,670

[22] Filed: Nov. 1, 1983

Related U.S. Application Data

[63] Continuation of Ser. No. 511,978, Jul. 11, 1983, abandoned, which is a continuation of Ser. No. 302,142, Sep. 14, 1981, abandoned.

[51] Int. Cl.$^3$ ............................................. C08L 39/02
[52] U.S. Cl. ..................................... 524/801; 524/555
[58] Field of Search ................................ 524/801, 555

[56] References Cited

U.S. PATENT DOCUMENTS

| | | | |
|---|---|---|---|
| 2,980,609 | 4/1961 | House et al. | 210/734 |
| 3,284,393 | 11/1966 | Vanderhoff | 526/317 |
| 3,418,237 | 12/1968 | Booth et al. | 210/907 |
| 3,578,586 | 5/1977 | Gal et al. | 210/734 |
| 3,658,771 | 4/1972 | Volk et al. | 209/5 |
| 3,691,124 | 9/1972 | Barron | 524/801 |
| 3,850,898 | 11/1974 | Ide et al. | 210/734 |
| 3,872,063 | 3/1975 | Kim | 526/240 |
| 3,926,756 | 12/1975 | Restaino | 260/29.6 TA |
| 3,996,180 | 12/1976 | Kane | 260/29.6 H |
| 3,997,792 | 12/1976 | Kane | 524/801 |
| 4,035,347 | 7/1977 | Korzenski et al. | 526/240 |
| 4,237,253 | 12/1980 | Jacquet et al. | 526/240 |
| 4,288,582 | 9/1981 | Lucas et al. | 526/240 |
| 4,300,450 | 5/1982 | Lipowski et al. | 210/734 |
| 4,309,329 | 1/1982 | Lucas et al. | 526/240 |

FOREIGN PATENT DOCUMENTS 2543135 10/1976 Fed. Rep. of Germany ...... 210/727
51-1891376 6/1976 Japan .

OTHER PUBLICATIONS

ACS Articles "Fractionation of Linear Polyethylene with Gel Permeation Chromatography", pp. 99–107.

*Primary Examiner*—Joseph L. Schofer
*Assistant Examiner*—N. Sarofim
*Attorney, Agent, or Firm*—Donald M. Papuga; Eugene C. Troutlein; Henry H. Gibson

[57] ABSTRACT

Described herein are water soluble ter- or higher polymer water-in-oil emulsions comprising:
(a) an aqueous phase comprising from about 60 to about 80 weight percent and containing therein from about 30 to about 70 weight percent of a ter- or higher polymer and from about 30 to about 70 weight percent of water,
(b) a hydrophobic liquid comprising from about 15 to about 39.5 weight percent, and
(c) an oil-soluble surfactant comprising from about 0.5 to about 5 weight percent, said weight percents based on the total weight of the emulsion.

9 Claims, No Drawings

POLYMER WATER-IN-OIL EMULSIONS

This application is a continuation of our prior U.S. application Ser. No. 511,978, filed July 11, 1983, now abandoned which is a continuation of Ser. No. 302,142 Sept. 14, 1981, now abandoned.

This invention is directed to water soluble ter- or higher polymer water-in-oil emulsions. These emulsions may be readily inverted into aqueous systems wherein said polymer is released. The polymers are suitable for use as thickeners and for use in water treatment.

Water-in-oil emulsions of water soluble vinyl addition polymers and copolymers are widely used in water treatment. For example, U.S. Pat. No. 3,996,180 describes water-in-oil emulsions of acrylamide and its water-soluble copolymeric derivatives. These emulsions may be readily inverted into aqueous systems which makes them especially suited for water treatment applications.

The water-in-oil emulsion of this invention contains a ter- or higher polymer containing at least one hydrophobic monomer. This water-in-oil emulsion is stable and the polymer in the emulsion exhibits an apparently uniform chemical composition.

This ter- or higher polymer water-in-oil emulsion may be inverted into aqueous systems wherein polymer is released. The polymer has been found to be particularly effective in water treatment.

THE INVENTION

This invention is directed to a ter- or higher polymer water-in-oil emulsion comprising:

(a) an aqueous phase comprising from about 60 to about 80, preferbly from about 68 to about 78 weight percent, and containing therein from about 30 to about 70, preferably from about 35 to about 55 weight percent of a ter- or higher polymer and from about 30 to about 70, preferably from about 45 to about 65 weight percent of water;

(b) a hydrophobic liquid comprising from about 15 to about 39.5, preferably from about 19 to about 31 weight percent, and (c) an oil-soluble surfactant comprising from about 0.5 to about 5, preferably from about 1 to about 3 weight percent, said weight percents based on the total weight of the emulsion.

The polymer water-in-oil emulsions of this invention may be readily inverted into aqueous systems. The polymer which is released by the inversion may be used as for example, a thickener or for water purification, such as to facilitate the settling of particles in phosphate slimes. A process for flocculating phosphate slimes is described in U.S. patent application Ser. No. 302,141 filed in the names of M. Rosen et al, titled "Process for Flocculating Phosphate Slimes" and filed on the same date as this application.

The water-in-oil emulsion is prepared by the process as described in U.S. patent application Ser. No. 302,108 filed in the names of Y. Fan et al, titled "A Process For Producing A Polymer Water-In-Oil Emulsion" and filed on the same date as this application.

In said U.S. patent application Ser. No. 302,108 a semi-continious process for producing a polymer water-in-oil emulsion is described which process comprises:

(a) combining: (i) an aqueous solution comprising at least one water-soluble monomer, and (ii) a mixture comprising a hydrophobic liquid, a hydrophobic monomer and an oil-soluble surfactant:

(b) homogenizing the mixture from (a) to form a water-in-oil emulsion;

(c) deoxygenating said homogenized water-in-oil emulsion;

(d) continually adding the homogenized water-in-oil emulsion to a reactor while adding thereto a deoxygenated initiator solution;

(e) heating the mixture from (d) under polymerization conditions so as to form a polymer water-in-oil emulsion; and (f) recovering a polymer water-in-oil emulsion.

A water-soluble surfactant is generally added to the recovered water-in-oil emulsion (f). These water-in-oil emulsions are solubilized, or inverted, in the presence of water so that the polymer readily goes into solution.

In the first step of the process, an aqueous solution containing a water-soluble monomer(s) is combined with a mixture containing a hydrophobic liquid, a hydrophobic monomer and an oil-soluble surfactant. This combination of materials is homogenized to form a water-in-oil emulsion.

The aqueous solution contains a mixture of water soluble monomers. These monomers have a water solubility of at least 5 weight percent and include acrylamide, methacrylamide, acrylic acid, methacrylic acid, and their alkali metal salts, aminoalkyl acrylate, aminoalkyl methacrylate, dialkylaminoalkyl acrylate, dialkylamino methacrylate and their quaternized salts with dimethyl sulfate or methyl chloride, vinyl benzyl dimethyl ammonium chloride, alkali metal and ammonium salts of 2-sulfoethylacrylate, alkali metal and ammonium salts of vinyl benzyl sulfonates, maleic anhydride, 2-acrylamide-2-methylpropane sulfonic acid, and the like. The preferred monomers are acrylamide and acrylic acid.

If acrylic acid is used as a monomer it is reacted with a base, preferably with an equivalent amount of base, such as sodium hydroxide, so that the sodium acrylate solution has a pH of from about 5.0 to about 10.0, preferably from about 6.5 to about 8.5, depending on the type and amount of base employed. This solution is combined with another water soluble monomer, such as acrylamide, and then with water to form the aqueous phase.

The aqueous phase comprises from about 65 to about 80, preferably from about 70 to about 78 weight percent of the total composition.

The mixture which is combined with the aqueous solution containing the water-soluble monomers contains a hydrophobic liquid, a hydrophobic monomer and an oil-soluble surfactant.

The hydrophobic liquids suitable for use herein include benzene, xylene, toluene, mineral oils, kerosenes, petroleum, and mixtures thereof. A preferred hydrophobic liquid is Isopar M (sold by Humble Oil and Refinery Company).

The hydrophobic monomer(s) which may be used in this invention include one or more of vinyl esters, such as vinyl acetate, alkyl acrylates, such as ethylacrylate, alkyl methacrylates such as methyl methacrylate, vinyl ethers such as butylvinyl ether, acrylonitrile, styrene and its derivatives, such as α-methylstyrene, N-vinyl carbazole, and the like.

The surfactants suitable for use herein are usually of the oil-soluble type having a Hydrophile-Lipopnile Balance (HLB) value of from about 1 to about 10, preferably from about 2 to about 6. These surfactants are normally referred to as the water-in-oil type. The surfactants include fatty acid esters, such as sorbitan monolaurate, sorbitan monstearate, sorbitan monooleate, sorbitan trioleate, mono and diglycerides, such as mono and diglycerides obtained from the glycerolysis of edible fats, polyoxyethylenated fatty acid esters, such as polyoxyethylenated (4) sorbitan monostearate, polyoxyethylenated linear alcohol, such as Tergitol 15-S-3 and Tergitol 25-L-3 (both supplied by Union Carbide Corp.), polyoxyethylene sorbitol esters, such as polyoxyethylene sorbitol beeswax derivative, polyoxyethylenated alcohols such as polyoxyethylenated (2) cetyl ether, and the like.

The mixture of the aqueous phase and oil phase contains from about 15 to about 50 weight percent of the hydrophobic liquid and hydrophobic monomer(s), based on the total weight of the composition.

The aqueous solution (i) containing the water-soluble monomers is combined with the mixture containing a hydrophobic liquid, a hydrophobic monomer(s) and an oil-soluble surfactant. This mixture is homogenized to form a water-in-oil emulsion. Homogenization takes place by subjecting the mixture to high shear mixing techniques which are generally well-known in the art. These include the use of homogenizers, high speed mixers and any other techniques for obtaining high shear mixing. The homogenization is carried out at a temperature of from about 10° to about 40° C., preferably from about 15° to 25° C. The homogenization may be carried out either continuously or in a batch process.

The emulsions so prepared have a rather narrow particle size distribution. The diameters of the majority of the particles range from about 0.2 to about 5.0 microns, preferably from about 1 to about 3 microns.

The water-in-oil emulsion so produced comprises:
(a) An aqueous phase comprising from about 45 to about 80, preferably from about 48 to about 78 weight percent and containing water-soluble monomer(s) wherein the monomers comprise from about 20 to about 60, preferably from about 30 to about 50 weight percent;
(b) A hydrophobic liquid and hydrophobic monomer(s) comprising from about 15 to about 50, preferably from about 20 to about 40 weight percent;
(c) An oil-soluble surfactant comprising from about 0.1 to about 5, preferably from about 1 to about 3 weight percent.

After forming the water-in-oil emulsion, it is generally deoxygenated, by for example, subjecting the emulsion to a vacuum of from about 50 to about 500, preferably from about 100 to about 200 mm of mercury under an inert gas atmosphere at a temperature of from about 5° to about 30° C., either continuously or as a batch process.

A reactor is continuously charged with the deoxygenated water-in-oil emulsion. Preferably, an initial charge of between about 20 to about 50 percent of the deoxygenated emulsion is added to the reactor. Most preferably, the reactor is charged with an amount of deoxygenated water in-oil emulsion so as to cover the agitator blades therein. The amount charged to the reactor depends on the geometry and size of the reactor.

Also, a catalyst or initiator useful in polymerizing etnylenically unsaturated monomers is added to the reactor. These catalysts include one or more azo and/or peroxide containing compounds, such as t-butyl hydroperoxide, t-butyl perbenzoate, benzoyl peroxide, ammonium persulfate, cumene hydroperoxide, 2,2'-azobis(isobutyronitrile), 2,2'-azobis(2,4-dimethylveloronitrile), redox catalysts, and others known in the art. These catalysts are added to the reactor either directly or in the form of a solution, i.e., the catalyst is dissolved in a solvent, such as a hydrocarbon liquid, i.e., toluene. The catalyst solution contains from about 1 to about 10, preferably from about 3 to about 6 weight percent of the catalyst.

From about 1 to about 99, preferably from about 20 to about 60 percent of the catalyst solution is initially added to the reactor containing the water-in-oil emulsion.

The remaining water-in-oil emulsion and catalyst solution are then continually fed into the reactor.

The polymerization is carried out at a temperature of from about 30° to about 70° C., preferably from about 40° to about 55° C., most preferably from about 48° to about 52° C., for about 1 to about 10 hours, preferably from about 2 to about 6 hours. The reaction time depending on the size of the reactor and the polymerization conditions.

The polymerization is generally carried out at atmospheric pressure, although subatmospheric and superatmospheric pressures may be used. The polymerization is preferably carried out under an inert atmosphere, such as a helium, argon or nitrogen.

The polymerization reaction generates considerable amount of heat which must be removed. Generally, the heat is dissipated by normal cooling facilities.

The polymerization reaction rate may be controlled by the introduction of small quantities of air (atmospheric air and/or oxygen) into the reaction. The air may be introduced, i.e., sparged, either intermittently or continuously into the reactor to control the reaction temperature. When a continuous air sparging is employed, the amount of oxygen in the reaction medium must be carefully controlled so as to achieve the desired rate of polymerization. An oxygen content of from about 0.01 to about 1.0, preferably from about 0.02 to about 0.50 parts per million is desirable. When the air is introduced intermittently, a flow rate of from about 0.01 to about 1.0, preferably from about 0.05 to about 0.5 cubic inches per minute, per pound of reactor charge is desirable. The duration of air injection may vary from a fraction of a second to a few seconds, and it may be repeated as many times as necessary until a desired rate of polymerization is achieved.

After the polymerization is complete, an antioxidant may added to the reaction mass. Any organic antioxidant suitable for the inhibition of free radical reactions may be used. The antioxidant is generally dissolved in a suitable solvent. The preferred antioxidants include substituted phenols, such as Ionol, thiobisphenol, such as Santonox-R, and hydroquinone derivatives, such as the monomethyl ether of hydroquinone, benzothiazole, ammonium or sodium thiosulfate, thiocyanate of alkaline metals, aminocarboxylic acid and sodium nitrite. The suitable solvents include toluene, benzene, xylene, diethyl ether, methyl acetate, water and the like. The antioxidant is present in the solution in amounts of from about 1 to about 30, preferably from about 5 to about 10 percent.

The antioxidant solution is added to the reaction mass in amounts of from about 0.05 to about 5 parts per hundred parts of resin.

Addition of the antioxidant may be commenced either at the end of the polymerization or after the reaction mixture has been cooled to ambient temperature.

The reaction mass is generally cooled to about 25° C. and the polymer water-in-oil emulsion recovered.

The polymers in the water-in-oil emulsion have an intrinsic viscosity of from about 2 to about 40, preferably from about 10 to about 35, and most preferably from about 18 to about 30 dl/g as measured in a one normal (N) aqueous sodium chloride solution at 25° C.

The preferred acrylamide containing polymers have an intrinsic viscosity of at least about 15 dl/g and are described in U.S. patent application Ser. No. 302,110 filed in the names of Y. Fan et al titled "High Molecular Weight Water Soluble Polymers" and filed on the same date as this application.

The acrylamide containing polymers in said U.S. patent application Ser. No. 302,110 are of the following formula:

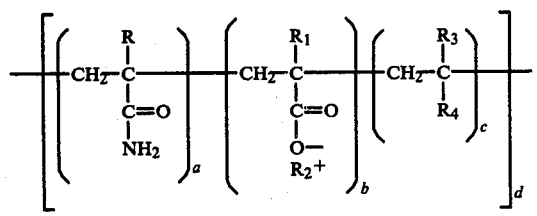

wherein R, $R_1$ and $R_3$ are independently hydrogen or methyl, $R_2^+$ is an alkali metal ion, such as $Na^+$ or $K^+$, $R_4$ is $OR_5$, where $R_5$ is an alkyl group having up to 5 carbon atoms,

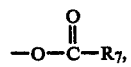

wherein $R_7$ is either methyl or ethyl,

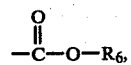

phenyl substituted phenyl, CN, or

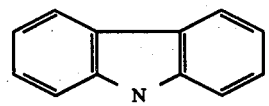

and $R_6$ is an alkyl group having up to 8 carbon atoms, wherein (a) is from 5 to about 90, preferably from about 30 to about 60 percent, (b) is from 5 to about 90, preferably from about 30 to about 60 percent, (c) is from about 0.2 to about 20, preferably from about 1 to about 10 percent and (d) is an integer of from about 1,000 to about 500,000, preferably from about 100,000 to about 500,000.

Under certain conditions, the alkoxy or acyloxy groups in the polymer may be partially hydrolyzed to the corresponding alcohol group and yield a tetrapolymer of the following general formula:

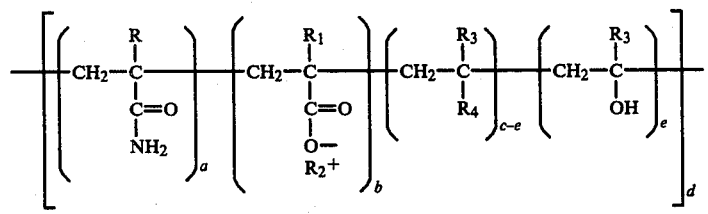

wherein R, $R_1$, $R_2^+$, $R_3$, $R_4$, a, b, c, and d are as previously defined and e is from about 0.1 to about 20 percent;

The preferred polymers are terpolymers of the following formula:

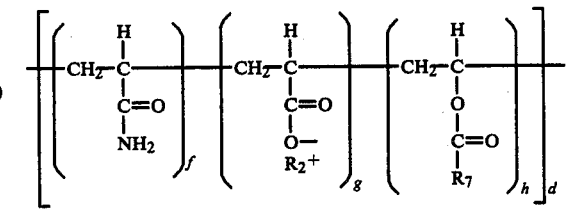

wherein $R_2^+$ is $Na^+$ or $K^+$, $R_7$ is methyl, ethyl, butyl, and f is from about 5 to about 90, preferably from about 30 to about 60 percent, g is from about 5 to 90, preferably from about 30 to 60 percent n is from about 0.2 to about 20, with the proviso that (f)+(g)+(h) equal 100 and d is as previously defined.

The preferred tetrapolymers are of the following formula:

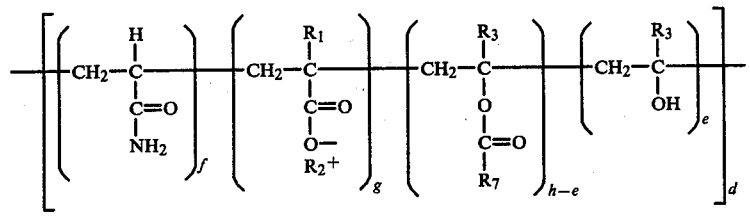

wherein $R_1$, $R_2^+$, $R_3$, $R_7$, f, g, h, d and e are as previously defined After the water-in-oil emulsion is prepared, a water-soluble inverting surfactant may be added thereto. The surfactants which may be used include polyoxyethylene alkyl phenol, polyoxyethylene (10 mole) cetyl ether, polyoxyethylene alkyl-aryl ether, quaternary ammonium derivatives, potassium oleate, N-cetyl N-ethyl morpholinium ethosulfate, sodium lauryl sulfate, condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (mannitolanhydride, called Mannitan, and sorbitol-anhydride, called Sorbitan). The preferred surfactants are ethoxylated nonyl phenols, ethoxylated nonyl phenol formaldehyde resins, and the like.

The inverting surfactant is used in amounts of from about 0.1 to about 20, preferably from about 1 to about 10 parts per one hundred parts of the polymer.

The water-in-oil emulsion containing the inverting surfactant is solubilized or inverted in the presence of water. The polymer-containing emulsion releases the polymer in the water in a very short period of time.

EXAMPLES

The following examples serve to give specific illustrations of the practice of this invention but they are not intended in any way to limit the scope of this invention.

EXAMPLE 1

Preparation of monomer emulsion feed:
(i) Sodium acrylate solution: An acrylic acid solution containing 158.2 gm of acrylic acid and 186.94 gm of deionized water was neutralized with a freshly prepared 40 percent sodium hydroxide solution (about 229.09 gm) to a final pH of 6.5. The neutralization was carried out at a temperature not exceeding 20° C. to prevent premature polymerization from taking place.
(ii) Acrylamide solution: The solution was prepared by adding 205.69 gm of acrylamide crystals under vigorous stirring to 251.95 gm of deionized water at a temperature below 25° C. Air was present during the dissolution to inhibit polymerization.
(iii) Oil-soluble monomer and surfactant mixture: A homogenous solution was prepared by dissolving 18.92 gm of a sorbitan monooleate (Span-80 supplied by Imperial Chemical Industries) into 339.5 gm of Isopar-M while stirring. Thereafter, 21.27 gm of vinyl acetate was rapidly added and the system stirred for an additional five minutes to yield a uniform mixture.
(iv) Monomer emulsion feed: Into a Waring blender, containing mixture (iii), was added, under vigorous stirring, solutions (i) and (ii). The latter was combined with 0.06 gm of ethylenediamine tetraacetic acid prior to its addition to ensure compositional uniformity of the finished monomer emulsion.

The monomer emulsion as prepared above was thoroughly deoxygenated by stirring under a vacuum for 10 minutes and subsequently breaking the vaccum with nitrogen; this procedure was repeated two more times. Thereafter, the monomer emulsion was kept at 25° C. or below under a nitrogen atmosphere until its complete addition. The storage tank was equipped with a cooling coil (jacket), a temperature measuring device, and an air-injection dip tube which can be used to stop the polymerization in case of an accidental initiation.

Initiator solution feed: This solution was prepared by dissolving 0.78 gm of 2,2'-azobis(isobutyronitrile) dissolved in 17.78 gm of toluene. The solution was purged with nitrogen before and during the course of polymerization.

Inhibitor solution: The solution was prepared by dissolving 0.78 gm of a thiobisphenol (Santonox-R supplied by Monsanto Chemical Co.) in 10 gm of toluene.

The reactor consisted of a two-liter Pyrex glass reactor equipped with a turbine agitator, two addition funnels, a condenser, a thermometer, and a nitrogen inlet and outlet tube. An external heating/cooling bath was employed. The turbine agitator had a four-one-inch blade impeller and the blades were pitched at a 45° angle to the driving shaft.

The reactor was charged, under a nitrogen atmosphere, with 282.32 gm (20 percent) of the monomer emulsion. While the nitrogen flow continued, heating was applied to bring the reaction temperature to 55° C. Once the temperature was stabilized, 3.91 gm of the initiator solution was quickly added. Thereafter, both the monomer emulsion and the catalyst solution streams were continuously fed into the reactor at rates such that feeding was complete in about two hours. The induction time was usually very short and an exotherm may occur immediately after the initiator addition. After charging was complete, the polymerization was allowed to continue for two additional hours. During this period, sufficient cooling was provided to dissipate the heat of polymerization. The reactor temperature was maintained at 55±2° C. At the end of polymerization, the inhibitor solution was added and the reactor was allowed to cool to room temperature (about 25° C.). The product was discharged through a two-layer cheese cloth. The conversion was usually quantitative and the finished emulsion contained about 30 percent by weight of polymer. The polymer had an intrinsic viscosity of 18.4 dl/gm. as measured in a one normal aqueous sodium chloride solution. The emulsion was highly uniform and contained very fine particles which had diameters raging from 0.2 to 2 microns.

EXAMPLE 2

Preparation of monomer emulsion feed
(i) Sodium acrylate solution: An acrylic acid solution containing 124.84 gm acrylic acid and 227.86 gm of deionized water was neutralized with a freshly prepared 40 percent sodium hydroxide solution (about 173.39 gm) to a final pH of 6.5. The neutralization was carried out at temperatures not exceeding 20° C. to prevent premature polymerization from taking place.
(ii) Acrylamide solution: This solution was prepared by adding 205.93 gm of acrylamide crystals to 261.6 gm of water under vigorous stirring at temperatures below 25° C. Air was present during the dissolution to inhibit polymerization.
(iii) Oil-soluble monomer and surfactant mixture: A homogenous solution was prepared by dissolving 19.12 gm of Span-80 into 339.43 gm of Isopar-M under agitation. Thereafter, 66.6 gm of ethyl acrylate was rapidly added and the system stirred for an additional five minutes to yield a uniform mixture.

The monomer emulsion feed was prepared and deoxygenated, the initiator solution feed and inhibitor solution were prepared and the monomers polymerized all by the procedure as described in Example 1.

The product was a milky white water-in-oil emulsion. Examination by an optical microscope showed that the average diameter of the suspended particles was about 1 to 2 microns. The polymer had an intrinsic viscosity of 16.4 dl/gm as measured in a one normal aqueous sodium chloride solution.

EXAMPLE 3

The procedure of Example 1 was exactly repeated except that the 2,2'-azobis(isobuytyronitrile) initiator was replaced with the same amount of 2,2-azobis(2,4-dimethyl-valeronitrile (Vazo-52 supplied by E. I. du Pont de Nemours Co.)). A uniform milky white water-in-oil emulsion was produced. The average diameter of the suspended particles was measured by an optical microscope and found to be about 1.5 microns. The polymer had an intrinsic viscosity of 18.1 dl/gm as measured in a one normal aqueous sodium chloride solution.

EXAMPLE 4

The procedure of Example 1 was exactly repeated except that the 2,2'-azobis(isobutyronitrile) initiator was replaced with the same amount of 2,2-azobis(2,4-dimethyl-valeronitrile) and the polymerization was carried out at a temperature of 43° C. instead of 55° C. A uniform, milky white water-in-oil emulsion was produced. The polymer had an intrinsic viscosity of 28.6 dl/gm as measured in a one normal aqueous sodium chloride solution.

EXAMPLE 5

A portion of the product prepared in Example 1 was thoroughly mixed with a water soluble surfactant, i.e., a polyoxyethylenated nonylphenol (Tergitol NP-10 supplied by Union Carbide Corporation) to yield an emulsion containing about 1.5 percent by weight of the surfactant. This mixture can be rapidly dissolved in water with stirring. An aqueous solution containing 0.3 percent of this polymer had a typical Brookfield viscosity about 2,400 centipoise (Brookfield Viscometer Model HBT, Spindle No. 2, 10 RPM and at 25° C.).

EXAMPLE 6

A portion of the product made in Example 2 was mixed with a water soluble surfactant, i.e., a polyoxyethylenated nonylphenol (Tergitol NP 13 suplied by Union Carbide Corp.) to yield an emulsion containing about 1.5 percent by weight of the surfactant. An aqueous solution containing 1 percent by weight of this emulsion had a Brookfield viscosity of about 2,200 centipoise (as measured by the procedure in Example 18).

EXAMPLE 7

Into a 500 ml, 4-necked, resin flask, fitted with a condenser, a thermometer, a mechanical stirrer, an additional funnel and a nitrogen inlet tube, were added 75 g of Isopar M and 14.4 g of Span 80 under nitrogen gas. In a separate beaker, 2.8.2 g of acrylic acid dissolved in 50 g of distilled water was neutralized (pH~6.7) with 39.2 g of a 40 percent sodium hydroxide solution. The sodium acrylate solution was combined with an aqueous solution made with 47.1 g. of acrylamide of 79 g of distilled water. The aqueous solution was purged with nitrogen and then added to the Isopar M-Span 80 mixture with rapid stirring to produce an emulsion. The emulsion was stirred under a nitrogen atmosphere for about ½ hour. 15.1 g of ethyl acrylate, 0.20 g of 2,2'azobis(isobuytyronitrile). The reaction mixture was heated to 40° C. and 0.02 g of sodium bisulfite in 10 ml distilled water added. The temperature of the emulsion was gradually increased to 43° C. At the same time, a solution made with 15 g of Isopar M and 4.4 g of Span 80 was slowly added to the reaction mixture. The polymerization was carried out at a temperature of 43°-45° C. for 4 hours and then at 55° C. for 1 hour. A smooth emulsion was obtained at the end of the reaction. A gas chromatographic study of the emulsion indicated that only four percent of the amount of ethyl acrylate used was left unreacted.

A portion of the polymer in the emulsion was precipitated by adding the emulsion to isopropanol. The polymer was isolated by filtering. The polymer had an intrinsic viscosity of 16.7 dl/g as measured in a one normal aqueous sodium chloride solution.

A clear aqueous solution was obtained when the isolated polymer was dissolved in water indicating that no homopolymer of ethyl acrylate was formed.

EXAMPLE 8

The same procedure described in Example 7 was exactly repeated except that 21.7 g of acrylic acid, 60.0 g of acrylamide and 6.1 g of ethyl acrylate were used. Also 85 g of Isopar M were used initially and the addition of Isopar M (15 g)-Span 80 (4.4 g) was omitted. Additionally 0.2 g of 2,2'azobis(isobutyronitrile) was used as the sole initiator. The acrylic acid was neutralized with 30.1 g of a 40 percent sodium hydroxide solution to yield a pH of 7.01.

The polymer produced had an intrinsic viscosity of 11.1 dl/g as measured in a one normal aqueous sodium chloride solution.

EXAMPLES 9 TO 12

The procedure described in Examples 7 and 8 were used to prepare the polymer emulsions of Examples 9 and 12. The emulsions obtained were used as flocculants in phosphate slimes.

Aqueous solutions of the polymer emulsions containing 0.3 g of the polymer were made by dissolving the desired amount of the water-in-oil polymer emulsion in distilled water containing about 0.14 g of an inverting sufactant (Tergitol NP-13) and diluted to 100 g. The solutions were used as flocculants in phosphate slimes. The performance of the polymer emulsion as a flocculants in phosphate slimes (Slime 1 and Slime 2 were two phosphate slimes obtained from a phosphate mining company) was measured by the time in seconds for the falling interface to travel 30 percent of the height of the sedimentation tube (designated '70). The results are shown in Table I. Control A contains no polymer.

| Example | Method as Described in Example | Mole Ratio Sodium Acrylate | Acrylamide | Ethyl Acrylate | Performance, '70 (sec) Phosphate Slime 1 | Phosphate Slime 2 |
|---|---|---|---|---|---|---|
| 9 | 7 | 32.5 | 55.0 | 12.5 | 8.4 | |
| 10 | 7 | 25.0 | 62.5 | 12.5 | 9.7 | |
| 11 | 8 | 25.0 | 70.0 | 5.0 | | 7.9 |
| 12 | 8 | 10.0 | 85.0 | 5.0 | | 8.1 |
| Control | — | — | — | — | | >serveral hours |

| | Method as De- scribed in Example | Mole Ratio | | | Performance, '70 (sec) | |
|---|---|---|---|---|---|---|
| Ex am- ple | | Sodium Acry- late | Acryl- amide | Ethyl Acry- late | Phos- phate Slime 1 | Phos- phate Slime 2 |
| A | | | | | | |

EXAMPLE 13

The procedure described in Example 1 was repeated with the exceptions that Vazo-52 was substituted for Vazo-64, the polymerization was carried out at 45° C. instead of 55° C., and neutralization of acrylic acid was conducted to an end point of pH of 8.6. A uniform, milky emulsion was obtained. The conversion was quantitative. The polymer produced had an intrinsic viscosity of 28.6 dl/gm as measured in a one normal aqueous sodium chloride solution.

EXAMPLE 14

The procedure described in Example 13 was repeated with the exception that 0.09 gm of Vazo-52 was employed as the initiator. The reaction proceeded smoothly and a white milky emulsion was obtained. The conversion was quantitative. The polymer produced had an intrinsic viscosity of 29.7 dl/gm as measured in a one normal aqueous sodium chloride solution.

EXAMPLE 15

The procedure described in Example 13 was repeated with the exceptions that the polymerization was carried out at 52° C. instead of 45° C., and neutralization of acrylic acid was titrated to an end point of a pH equal to 9.4. A uniform, milky emulsion was obtained. The conversion was quantitative. The polymer produced had an intrinsic viscosity of 20.6 gl/gm as measured in a one normal aqueous sodium chloride solution.

EXAMPLE 16

The procedure described in Example 1 was repeated with the exceptions that the acrylamide solution was made of 411.38 gm of acrylamide-50 (a 50 percent acrylamide solution supplied by American Cyanamid) and 46.26 gm of water, the polymerization was carried out at 52° C. instead of 55° C. A milky white emulsion was obtained. The conversion was quantitative. The polymer produced had an instrinsic viscosity of 21.7 dl/gm as measured in a one normal aqueous sodium chloride solution.

EXAMPLE 17

A (vinylacetate-sodium acrylate-acrylamide)terpolymer was prepared according to the following procedures:

(a) Polymerization Recipe:

| Ingredient | Weight, gm |
|---|---|
| Acrylic Acid | 158.2 |
| Sodium Hydroxide | 91.64 |
| Acrylamide | 205.69 |
| Vinyl Acetate | 21.27 |
| Ethylenediame tetraacetic acid | 0.06 |
| Isopar-M | 339.5 |
| Span-80 | 18.92 |
| Vazo-64 | 0.78 |
| Toluene | 28.78 |
| Santonox-R | 0.78 |

| Ingredient | Weight, gm |
|---|---|
| Deionized Water | 576.34 |
| Total | 1,441.96 |

(b) Preparation of Monomer Emulsion Feed (1) Sodium acrylate solution: An acrylic acid solution containg 158.2 gm of acrylic acid and 186.94 gm of deionized water was neutralized with a freshly prepared 40 percent sodium hydroxide solution (about 229.09 mg) to a final pH of 6.5. The neutralization was carried out at a temperature not exceeding 25° C. in order to prevent premature polymerization from taking place.

(2) Acrylamide solution: The solution was prepared by adding 205.69 gm of acrylamide crystals under vigorous stirring to 251.95 gm of deionized water at temperatures below 25° C. Air must be present during the dissolution to inhibit polymerization. The solution was cooled to about 20° C. before the subsequent emulsification.

(3) Oil-soluble monomer and surfactant mixture: A homogeneous solution was prepared by dissolving 18.92 gm of Span-80 into 339.5 gm of Isopar-M while stirring. Thereafter, 21.27 gm of vinyl acetate was rapidly added and the system was stirred for an additional five minutes to yield a uniform mixture.

(4) Monomer emulsion feed: Into a Waring blendor, containing the mixture (3), was added while stirring, solutions (1) and (2). The latter should be combined together with 0.06 gm of ethylenediamine tetraacetic acid prior to the addition to ensure compositional uniformity of the finished monomer emulsion.

The monomer emulsion so formed was transferred into the reactor and degassed by stirring it under vacuum for 10 minutes and subsequently breaking the vacuum with nitrogen; this procedure was repeated two more times. Alternatively, the degassing step can be achieved by using nitrogen sparging only. For a two-liter size reactor, a 30-minute nitrogen sparging while stirring is usually sufficient.

(c) Initiator solution feed: The solution was prepared by dissolving 0.39 gm of Vazo-52 dissolved in 18.78 gm of toluene. The solution was purged with nitrogen before and during the course of polymerization.

(d) Initiator solution: The solution was prepared by dissolving 0.78 gm of Santonox-R in 10 gm of toluene.

(e) Polymerization reactor: A two-liter Pyrex glass reactor equipped with a turbine agitator, an additional funnel, a condenser, a thermometer, a nitrogen inlet and outlet, and an external heating/cooling bath was employed. The turbine agitator had a four-one-inch-blade impeller and the blades were pitched at a 45° angle to the driving shaft, and was operating at 650 rpm during the course of polymerization.

(f) Polymerization Procedures: A desired amount of Vazo-52/toluene solution, usually between 20 to 40 percent of the total initiator solution charge, was introduced into the degassed monomer emulsion in the reactor. While the nitrogen flow continued, external heating was applied to bring the reaction temperature to 52° C. Once the polymerization was initiated, the remaining initiator solution was added continuously into the reactor at a rate such that the addition was completed in two hours. When the initiator solution addition was finished, the polymerization was allowed to proceed for two additional hours. During the entire course of polymerization, sufficient cooling was provided to dissipate the heat of polymerization. The rate of polymerization, hence the rate of heat evolution, can be controlled by air sparging to maintain the reaction temperature at 52°±2° C. At the end of the polymerization, the emulsion was cooled to room temperature, and the inhibitor solution added. The product was discharged through a two-layer cheesecloth into suitable container(s). The water-in-oil emulsion produced was a fairly viscous, milky liquid. The conversion was quantitative. The polymer so produced had an intrinsic viscosity of 32 dl/gm as measured in a one normal aqueous sodium chloride solution.

EXAMPLE 18

The water-in-oil emulsion prepared in Example 17 can be easily dissolved in water in the presence of an inverting surfactant. 25.4 gm of the water-in-oil emulsion was thoroughly mixed with 1.5 gm of polyoxyethylenated nonylphenol (Tergitol NP-10, a surfactant supplied by Union Carbide Corp.), followed by dilution with distilled water to a total weight of 2,500 gm. The mixture was stirred until a uniform solution was produced. The solution was very viscous and exhibited a markedly stringy effect. It had a Brookfield viscosity of 2,912 centipoises at 25° C. (Model HBT, number 1 spindle and 10 rpm).

EXAMPLE 19

The procedure described in Example 17 was exactly repeated with the exception that the polymerization was conducted at 62° C. instead of 52° C., and neutralization of acrylic acid was carried out to a final pH of 9.37. A milky white emulsion was obtained. The conversion was quantitative. The polymer so produced had an intrinsic viscosity of 19.6 dl/gm as measured in a one normal aqueous sodium chloride solution.

EXAMPLE 20

The procedure described in Example 17 was exactly repeated with the exceptions that the polymerization was conducted at 57° C. instead of 52° C., and the initiator solution was prepared with 0.78 gm of Vazo-64 instead of 0.39 gm of Vazo-52. A milky white emulsion was obtained. The conversion was quantitative. The polymer so produced had an intrinsic viscosity of 18.4 dl/gm as measured in a one normal aqueous sodium chloride solution.

EXAMPLE 21

The procedure of Example 1 was used to prepare an emulsion containing an acrylamide/sodium acrylate/vinyl acetate terpolymer. The terpolymer contained 54.2 mole percent of acrylamide, 41.1 mole percent sodium acrylate and 47 mole percent of vinyl acetate. The terpolymer had an intrinsic viscosity of 13 dl/g as measured in a one normal aqueous sodium chloride solution.

An aqueous solution of the polymer emulsion containing 0.3 g of the polymer was made by dissolving the desired amount of the water-in-oil polymer emulsion in distilled water containing about 0.14 g of a polyethylenated nonylphenol surfactant (Tergitol NP-13) and diluted to 100 g. The solution was used as a flocculants in phosphate slimes. The performance of the polymer emulsion as a flocculant in a phosphate slime (a phosphate slime obtained from a phosphate mining company) was measured by the time in seconds for the falling interface to travel 30 percent of the height of the sedimentation tube (designated $t_{70}$).

The results are shown in Table II.

EXAMPLE 22

The procedure of Example 21 was repeated to prepare a terpolymer having an intrinsic viscosity of 15 dl/g as measured in a one normal aqueous sodium chloride solution. An aqueous solution of the polymer emulsion was prepared and tested as described in Example 21.

The results are shown in Table II.

EXAMPLE 23

The procedure of Example 21 was repeated to prepare a terpolymer having an intrinsic viscosity of 17 dl/g as measured in a one normal aqueous sodium chloride solution. An aqueous solution of the polymer emulsion was prepared and tested as described in Example 21.

The results are shown in Table II.

EXAMPLE 24

The procedure of Example 21 was repeated to prepare a terpolymer having an intrinsic viscosity of 19 dl/g as measured in a one normal aqueous sodium chloride solution. An aqueous solution of the polymer emulsion was prepared and tested as described in Example 21.

The results are shown in Table II.

EXAMPLE 25

The procedure of Example 21 was repeated to prepare a terpolymer having an intrinsic viscosity of 22 dl/g as measured in a one normal aqueous sodium chloride solution. An aqueous solution of the polymer emulsion was prepared and tested as described in Example 21.

The results are shown in Table II.

TABLE II

| Example | I.V. of Polymer (dl/g) | Performance, $t_{70}$(sec) |
|---|---|---|
| 21 | 13 | 41 |
| 22 | 15 | 30.5 |
| 23 | 17 | 20 |
| 24 | 19 | 13 |
| 25 | 22 | 11.5 |

We claim:
1. A water soluble ter-or higher addition polymer water-in-oil emulsion comprising:
   (a) an aqueous phase comprising from about 60 to about 80 weight percent and containing therein from about 30 to about 70 weight percent of a ter-or higher addition polymer containing at least one polymerized hydrophobic monomer and from about 30 to about 70 weight percent of water.
   (b) a hydrophobic liquid comprising from about 15 to about 39.5 weight percent; and
   (c) an oil-soluble surfactant comprising from about 0.5 to about 5 weight percent, said weight percent based on the total weight of the emulsion.
2. A water-in-oil emulsion as defined in claim 1 wherein the aqueous phase comprises from about 68 to about 78 weight percent and contains therein from about 30 to about 70 weight percent of a ter-or higher polymer and from about 30 to about 70 weight percent of water.

3. A water-in-oil emulsion as defined in claim 1 wherein the hydrophobic liquid comprises from about 19 to about 31 weight percent.

4. A water-in-oil emulsion as defined in claim 1 wherein the oil-soluble surfactant comprises from about 1 to about 3 weight percent.

5. A water-in-oil emulsion as defined in claim 1 wherein the terpolymer is of the following formula:

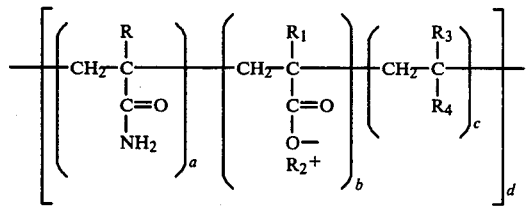

wherein R, R₁ and R₃ are independently hydrogen or methyl, $R_2^+$ is an alkali metal ion, such as Na+ or K+, R₄ is OR₅, where R₅ is an alkyl group having up to 5 carbon atoms,

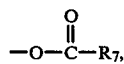

wherein R₇ is either methyl or ethyl,

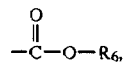

phenyl substituted phenyl, CN, or

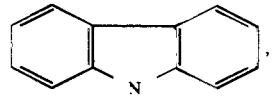

and R₆ is an alkyl group having up to 8 carbon atoms, wherein (a) is from about 5 to about 90, perferably from about 30 to about 60 percent, (b) is from 5 to about 90, preferably from about 30 to about 60 percent, (c) is from about 0.2 to about 20, preferably from about 1 to about 10 percent, and (d) is an integer of from about 1,000 to about 500,000.

6. A water-in-oil emulsion as defined in claim 5 wherein the higher polymer is a tetrapolymer of the following general formula:

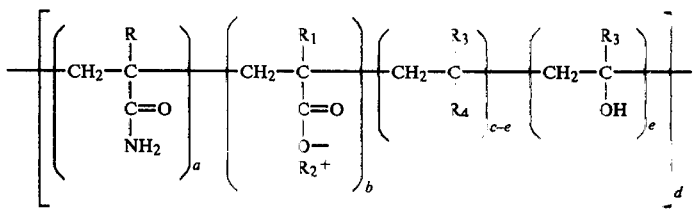

wherein R, R₁, $R_2^+$, R₃, R₄, a, b, c, and d are as defined in claim 5 and e is from about 0.1 to about 20 percent.

7. A water-in-oil emulsion as defined in claim 1 wherein the hydrophobic liquid is selected from benzene, xylene, toluene, mineral oils, kerosenes, petroleum, Isopar M, or mixtures thereof.

8. A water-in-oil emulsion as defined in claim 1 wherein the sufactant has an HLB value of from about 1 to about 10.

9. A water-in-oil emulsion as defined in claim 5 wherein the terpolymer has an intrinsic viscosity from about 15 to about 22 dl/g.

* * * * *

UNITED STATES PATENT AND TRADEMARK OFFICE
CERTIFICATE OF CORRECTION

PATENT NO. : 4,452,940
DATED : June 5, 1984
INVENTOR(S) : N. S. Chu, et al.

It is certified that error appears in the above—identified patent and that said Letters Patent is hereby corrected as shown below:

On the front page, the inventor name reading "Rosen" should read -- Chu et al. --.

On the front page, at column 1, line 2 "Inventor: Meyer R. Rosen, Spring Valley, N. Y." should read -- Inventors: N. S. Chu, Hartsdale, N. Y.; Y. L. Fan, East Brunswick, N. J.; G. L. Brode, Bridgewater, N. J.; and M. R. Rosen, Spring Valley, N. Y. --.

At column 10, line 57 insert the heading -- Table I --.

Signed and Sealed this

Second Day of October 1984

[SEAL]

Attest:

Attesting Officer

GERALD J. MOSSINGHOFF

Commissioner of Patents and Trademarks